United States Patent Office 2,954,286
Patented Sept. 27, 1960

2,954,286

PHOSPHATE-CONTAINING COMPLEX FERTILIZER MATERIAL PRODUCTION

John Kenneth Bradley, Ipswich, Geoffrey George Brown, Woodbridge, and William Francis Sheldrick, Felixstowe, England, assignors to Fisons Limited, Suffolk, England No Drawing. Filed Dec. 26, 1957, Ser. No. 705,094

Claims priority, application Great Britain Jan. 10, 1957

3 Claims. (Cl. 71—39)

The present invention relates to an improved process for the production of fertilizer materials.

Compound fertilizers contain two or more of the elements nitrogen, phosphorus and potassium, which are required for plant life, and are produced in liquid or powder form, and more usually in granular form. Such compound fertilizers comprise for example superphosphates, ammonium sulphate and potassium chloride, and are commonly prepared by mixing together materials containing the desired elements.

It has now been found that complex fertilizers may more conveniently be prepared by the reaction together of potassium chloride and nitric acid to produce a liquid product containing free nitric acid, removing the formed gaseous chlorine and nitrosyl chloride, and treating the product with phosphoric acid, if desired before or after the addition of a neutralizing agent such as ammonia. The complex fertilizer thus obtained may be more highly concentrated than can otherwise be obtained.

Accordingly the present invention is for a process for the production of a complex fertilizer which comprises reacting together potassium chloride and nitric acid to produce a liquid product containing free nitric acid, removing the formed nitrosyl chloride and chlorine and treating the product with phosphoric acid.

It is preferred to carry out the process using excess nitric acid since inter alia this permits the substantially complete reaction of the potassium chloride, with the result that a substantially or completely chloride-free fertilizer may be obtained, and the chlorine may be recovered fully.

Accordingly the preferred embodiment of the present invention is for a process for the production of a complex fertilizer which comprises reacting together potassium chloride and nitric acid, the nitric acid being present in excess over the requirement of 4 mols of nitric acid per 3 mols of potassium chloride, removing the formed nitrosyl chloride and chlorine, and treating the product with phosphoric acid.

According to one embodiment of the invention, the product is treated with a neutralizing agent, before and/or after the addition of phosphoric acid.

The use of excess nitric acid in the treatment of the potassium chloride is of importance, since the presence of excess nitric acid accelerates very considerably the rate of reaction, and makes the process amenable to continuous operation.

The nature of the excess of nitric acid may vary over a wide range and it has been found desirable to use at least 10%, and preferably 20–200% excess of nitric acid over the requirement of 4 mols of nitric acid per 3 mols of potassium chloride. It is found in general the use of nitric acid in amount greater than 100% excess has little effect in accelerating further the reaction rate. The proportion of nitric acid employed ultimately depends on the composition of the fertilizer material which it is desired to produce.

The potassium chloride employed may comprise any of the usually available salts and may be of high or low purity. This material may be used in the solid form, preferably finely divided, or as a solution, as is desired. The nitric acid employed should be of a concentration in the range of 50–95% by weight and this nitric acid is conveniently of a concentration of about 70%. The phosphoric acid employed is suitably a concentrated acid, for example of a concentration in the range 50–70% by weight.

The reaction between the nitric acid and potassium chloride is preferably effected at an elevated temperature, suitably in excess of 80° C. and may be carried out at normal, reduced or super-atmospheric pressure. It has been found most desirable to carry out the process at or about the boiling point of the reaction mixture, and when operating at normal pressures the use of temperatures in the range 100–120° C. is preferred. At such temperatures the reaction between potassium chloride and nitric acid is rapid and proceeds according to the following equation:

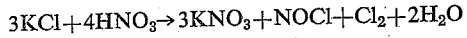

$$3KCl + 4HNO_3 \rightarrow 3KNO_3 + NOCl + Cl_2 + 2H_2O$$

The formed nitrosyl chloride and chlorine are evolved from the liquid product, and may be collected in any appropriate way.

The liquid product obtained in accordance with the present invention is treated with phosphoric acid.

The reaction product may be treated with a neutralizing agent before and/or after the addition of phosphoric acid. According to a preferred embodiment of the invention the product is treated with the neutralizing agent after addition of the phosphoric acid.

The amount of phosphoric acid which is employed in the process of the present invention is dependent ultimately on the N:P:K ratios of the fertilizer product which it is desired to produce. It is preferred to employ phosphoric acid in amount comprising a least 15% by weight, and preferably 30–200% by weight of the weight of the potassium chloride utilized in the process.

Similarly the amount of neutralizing agent which is introduced in to the liquid product is dependent on the nature of the desired product. If it is desired to obtain liquid fertilizers, the amount of neutralizing agent may vary over a wide range, and the neutralizing agent may be added in either aqueous or anhydrous form, while on the other hand, if it is desired to obtain a solid fertilizer, the amount of neutralizing agent incorporated requires to be sufficient for neutralization of the acid present, and is preferably added in anhydrous form, so as to reduce the volume of water required to be removed from the product. Vigorous agitation is most desirable during neutralization. The heat of neutralization is considerable, and according to a preferred feature of the invention, this is used to assist in dehydrating the mixture.

The neutralizing agent is preferably ammonia, inter alia, as this is the cheapest source of nitrogen, but may also comprise other materials such as potassium hydroxide, potassium carbonate and the like. Ammonia may be employed in aqueous form, for example of 25–33% concentration, or in anhydrous form.

Where ammonia is used as the neutralizing agent, it is preferred to add ammonia up to pH 4.4, so as to obtain monoammonium phosphate; if desired however ammonia addition can be continued to give diammonium phosphate or a mixture of the amomnium phosphates.

The product may be used as either a liquid fertilizer or as a solid fertilizer. In order to obtain a solid fertilizer, the liquid product may be evaporated to dryness to produce a powdered fertilizer; or to a semi-solid state which can be granulated, as for example in a slurry granulator, or prilled in a prilling tower. A product of this nature will be completely water-soluble.

If desired the product may be admixed with other materials commonly incorporated into fertilizer products such as phosphates, superphosphates, potassium salts and ammonium salts, or fillers, for example, chalk, gypsum, brick dust and the like.

The process of the present invention may be used of prepare products having a wide range of ratios $N:P_2O_5:K_2O$. The desired ratio may be obtained by appropriate selection of proportions of the reactants employed.

The gases comprising nitrosyl chloride, obtained in the first stage of the process are suitably treated to recover the chlorine and decompose the nitrosyl chloride to oxides of nitrogen and chlorine, as for example by oxidation with nitric acid. The gas mixture containing chlorine is suitably fractionated to isolate the chlorine, which is removed as a by-product, and the nitrogen oxides, as such, or oxidised to nitric acid, are suitably recycled to the system. A preferred embodiment of the present invention is a cyclic process for the production of a complex fertilizer which comprises reacting together potassium chloride and nitric acid, the nitric acid being employed in amount in excess over the requirement of 4 mols of nitric acid per 3 mols of potassium chloride, removing the formed nitrosyl chloride and chlorine, treating the liquid product with phosphoric acid, and treating the gases containing nitrosyl chloride and chlorine to decompose the nitrosyl chloride to nitrogen oxides and chlorine, isolating the chlorine and recycling the nitrogen oxides as such or as nitric acid to the first stage of the process.

The following examples are given to illustrate the process of the present invention:

*Example 1*

317 parts of particulate potassium chloride were added to 905 parts of 69.5% nitric acid and the mixture heated to 100° C. The reaction was completed in a few minutes and the evolved nitrosyl chloride and chlorine were collected. 345 parts of 40% phosphoric acid were added to the liquid product, and 97.1 parts of gaseous ammonia were introduced with agitation.

The resulting liquid product was evaporated to obtain a semi-solid slurry which was granulated in a slurry granulator, giving a solid product which is water-soluble containing 430 parts of potassium nitrate, 162 parts of monoammonium phosphate and 344 parts of ammonium nitrate, in which the ratios $N:P_2O_5:K_2O$ were 21.4:10.7:21.4.

The evolved nitrosyl chloride and chlorine gases were treated with nitric acid, and the resulting gaseous product fractionated yielding 151 parts of chlorine. The recovered nitrogen dioxide was oxidised to nitric acid.

*Example 2*

The apparatus employed in the process of the present example comprises two stages each stage containing a number of stirred reactors, arranged in series. 23.50 pounds per hour of 65% nitric acid and 11.37 pounds per hour of potassium chloride (60% $K_2O$) were fed continuously into the first of the three reactors in the first stage. The reaction temperature in the first stage was maintained at 115–120° C. and the nominal holding time in each reactor was 15 minutes. The reaction mixture overflowed from one reactor to the next in series and the overflow from the third reactor contained less than 1% of chloride, equivalent to 95% conversion of the potassium chloride.

The evolved chlorine and nitrosyl chloride were cooled to remove the nitric acid and water which were returned to the first reactor. The nitrosyl chloride was treated to recover the chlorine as elemental chlorine, and nitrogen was recycled to the first reactor as nitric acid. The first reactor was agitated sufficiently to ensure rapid dissolution of the potassium chloride in the nitric acid and also rapid disengagement of the gases as they are formed.

The overflow from the third reactor to the first stage was passed to two reactors arranged in series, comprising the second stage. To each reactor of the second stage was added 9.45 pounds per hour of 60% phosphoric acid. Anhydrous ammonia was added to each of the reactors at this stage with agitation such that the overflow from the final reactor was of pH 4.5, this being equivalent to an ammonia usage of 1.8 pounds per hour.

During the ammoniation stage the heat of reaction was used to concentrate the mixture so that the overflow from the final stage was of the desired consistency for slurry granulation or flaking. The final chloride concentration was less than 0.5%.

*Example 3*

The apparatus employed in the process of the present example comprises two stages each stage containing a number of stirred reactors, arranged in series. 24.6 pounds per hour of 65% nitric acid and 6.0 pounds per hour of potassium chloride (60% $K_2O$) were fed continuously into the first of the three reactors in the first stage. The reaction temperature in the first stage was maintained at 100–110° C. and the nominal holding time in each reactor was 10 minutes. The reaction mixture overflowed from one reactor to the next in series and the overflow from the third reactor contained less than 0.3% of chloride, equivalent to 98% conversion of the potassium chloride.

The evolved chlorine and nitrosyl chloride were cooled to remove the nitric acid and water which were returned to the first reactor. The nitrosyl chloride was treated to recover the chlorine as elemental chlorine, and nitrogen was recycled to the first reactor as nitric acid. The first reactor was agitated sufficiently to ensure rapid dissolution of the potassium chloride in the nitric acid and also rapid disengagement of the gases as they are formed.

The overflow from the third reactor of the first stage was passed to two reactors arranged in series, comprising the second stage. To each reactor of the second stage was added 8.7 pounds per hour of 60% phosphoric acid. Anhydrous ammonia was added to each of the reactors at this stage with agitation such that the overflow from the final reactor was of pH 4.5, this being equivalent to an ammonium usage of 3.2 pounds per hour.

During the ammoniation stage the heat of reaction was used to concentrate the mixture so that the overflow from the final stage was of the desired consistency for slurry granulation or flaking. The final chloride concentration was less than 0.1%.

*Example 4*

The apparatus employed in the process of the present example comprises two stages each stage containing a number of stirred reactors arranged in series. 24.6 pounds per hour of 65% nitric acid and 6.0 pounds per hour of potassium chloride (60% $K_2O$) were fed continuously into the first of the three reactors in the first stage. The reaction temperature in the first stage was maintained at 100–110° C. and the nominal holding time in each reactor was 5 minutes. The reaction mixture overflowed from one reactor to the next in series and the overflow from the third reactor contained less than 0.3% of chloride, equivalent to 98% conversion of the potassium chloride.

The evolved chlorine and nitrosyl chloride were cooled to remove the nitric acid and water which were returned to the first reactor. The nitrosyl chloride was treated to recover the chlorine as elemental chlorine, and nitrogen was recycled to the first reactor as nitric acid. The first reactor was agitated sufficiently to ensure rapid dissolution of the potassium chloride in the nitric acid and also rapid disengagement of the gases as they are formed.

The overflow from the third reactor of the first stage was passed to two reactors arranged in series, comprising the second stage. To each reactor of the second stage was added 8.7 pounds per hour of 60% phosphoric acid. Anhydrous ammonia was added to each of the reactors at this stage with agitation, such that the overflow from the final reactor was of pH 4.5, this being equivalent to an ammonium useage of 3.2 pounds per hour.

During the ammoniation stage the heat of reaction was used to concentrate the mixture so that the overflow from the final stage was of the desired consistency for slurry granulation or flaking. The final chloride concentration was less than 0.1%.

Example 5

Muriate of potash (60% $K_2O$) and nitric acid of 65% concentration were fed to a continuous stirred reactor system at hourly rates of 500 and 1350 pounds respectively. The reaction system was maintained at a temperature of 115–120° C. and nitrosyl chloride and chlorine were evolved. The gas mixture was submitted to a treatment by means of which it was converted to nitric acid and chlorine, the latter was taken off as a by-product and the former was returned continuously to the reaction system.

In a second stage of the process the liquid product from the above reaction system, containing the excess nitric acid, was mixed continuously with 128 pounds per hour of gaseous ammonia under conditions of vigorous agitation to give a pH of 4.5.

The solution from this second stage was passed to a third stage where it was mixed with 740 pounds per hour of phosphoric acid (40% $P_2O_5$) and 472 pounds per hour of 50% potassium hydroxide solution.

The resulting solution from the third stage passed to a granulating plant, the granular product amounting to 1950 pounds per hour, with an analysis of 15.3 N; 15.3 $P_2O_5$; 25.7 $K_2O$. The resulting product was water-soluble.

Example 6

Muriate of potash (60% $K_2O$) and nitric acid of 65% concentration were fed to a continuous stirred reactor system at hourly rates of 500 and 1350 pounds respectively. The reaction system was maintained at a temperature of 115–120° C. and nitrosyl chloride and chlorine were evolved. The gas mixture was submitted to a treatment by means of which it was converted to nitric acid and chlorine, the latter was taken off as a by-product and the former was returned continuously to the reaction system.

In a second stage of the process the liquid product from the above reaction system, containing the excess nitric acid, was mixed continuously with particulate solid potassium hydroxide under conditions of vigorous agitation to give a pH of 4.5. The thick slurry which was obtained was granulated.

We claim:

1. A process for the production of a complex fertilizer which comprises reacting together potassium chloride and nitric acid of a concentration in the range 50–95% by weight, at a temperature of the order of 100° C., the nitric acid being employed in amount comprising 10 to 200% excess over the requirement of 4 mols of nitric acid per 3 mols of potassium chloride, removing the formed nitrosyl chloride and chlorine, treating the liquid product free from nitrosyl chloride and chlorine with phosphoric acid of a concentration in the range 50–70% by weight, and treating the resulting product with ammonia, with vigorous agitation.

2. A cyclic process for the production of a complex fertilizer which comprises reacting together potassium chloride and nitric acid at a temperature about the boiling point of the reaction mixture, the nitric acid being employed in amount comprising 10 to 200% excess over the requirement of 4 mols of nitric acid per 3 mols of potassium chloride, removing the formed nitrosyl chloride and chlorine, treating the liquid product free from nitrosyl chloride and chlorine with phosphoric acid, and oxidizing the gases containing nitrosyl chloride and chlorine converting the nitrosyl chloride to nitrogen oxides and chlorine, isolating the chlorine and recycling the nitrogen oxides to the first stage of the process.

3. A cyclic process as claimed in claim 2 wherein the nitrogen oxides are oxidised to nitric acid prior to recycling to the first stage of the process.

References Cited in the file of this patent

UNITED STATES PATENTS

| | | |
|---|---|---|
| 2,170,843 | Turrentine | Aug. 29, 1939 |

FOREIGN PATENTS

| | | |
|---|---|---|
| 562,634 | Germany | Mar. 15, 1930 |